United States Patent [19]  [11] 4,074,011
Teramae et al.  [45] Feb. 14, 1978

[54] TOPCOATED PHOSPHATED BOLTS, NUTS AND WASHERS

[75] Inventors: Akira Teramae, Yokohama; Koji Yamada, Tokyo; Hironobu Kawasaki, Machida, all of Japan

[73] Assignee: Nippon Steel Corporation, Tokyo, Japan

[21] Appl. No.: 718,131

[22] Filed: Aug. 27, 1976

Related U.S. Application Data

[63] Continuation of Ser. No. 569,755, April 21, 1975, abandoned.

[30] Foreign Application Priority Data

Apr. 25, 1974 Japan .................................. 49-46877

[51] Int. Cl.$^2$ ........................ B32B 15/04; F16B 27/00
[52] U.S. Cl. .................................... 428/422; 85/1 C; 106/14; 148/6.15 R; 148/6.16; 428/457; 428/461; 428/469; 428/411; 428/543
[58] Field of Search ............... 428/457, 469, 500, 542, 428/422, 461; 427/409, 418; 148/6.15 R, 6.16, 31.5; 85/1 C; 106/14

[56] References Cited

U.S. PATENT DOCUMENTS

| | | | |
|---|---|---|---|
| 2,662,836 | 12/1953 | Montgomery et al. | 148/6.15 R |
| 3,079,288 | 2/1963 | Schneider | 148/6.16 |
| 3,565,699 | 2/1971 | Plaxton | 148/6.16 |
| 3,819,425 | 6/1974 | DeRidder et al. | 148/6.15 R |
| 3,960,610 | 6/1976 | Steinbrecher et al. | 148/6.15 R |

FOREIGN PATENT DOCUMENTS 1,119,536  7/1968  United Kingdom .................. 85/1 C Primary Examiner—George F. Lesmes
Assistant Examiner—P. J. Thibodeau
Attorney, Agent, or Firm—Toren, McGeady and Stanger

[57] ABSTRACT

A bolt, nut and washer is first coated with an undercoating consisting of metal phosphate, and is then coated with a second or top coating consisting of a chromium compound and one or more of a metal salt of higher fatty acid, polyolefin and polyethylene tetrafluoride dissolved or dispersed in a vehicle. The composite coating improves the corrosion resisting and lubricating properties of bolts, nuts and washers coated therewith, and also serves as an excellent base for paints.

1 Claim, No Drawings

TOPCOATED PHOSPHATED BOLTS, NUTS AND WASHERS

This is a continuation of application Ser. No. 569,755, filed on Apr. 21, 1975, now abandoned.

This invention relates to surface-treated bolts, nuts and washers having improved corrosion-resistance, lubrication and readily paintable coatings.

Recently, an increasing proportion of the total production of steel constructions is produced in large scale, with their structural parts being assembled by the use of bolts, nuts and washers after the parts have been previously coated with metallicone or primer coatings, and, in some cases, by further application of semi-finish coatings in the manufacturing plant. The reason for this is that it is now recognized that the steel construction once it is established requires higher cost for the surface treatment thereof and for the application of coatings thereon, though without correspondingly satisfactory results than the cost incurred by assembling the parts which have been previously surface-treated and coated under accurately controlled conditions in the manufacturing plant.

In assembling the structural parts into a complete steel construction, it has been conventional to use bolts having scale surfaces or corrosion-resisting lubricant oil coatings alone. The bolts when used to set up the steel construction become more susceptible to rust formation. Therefore, it has been the prior art practice before the application of a finish coating on the complete steel construction to carry out degreasing and descaling treatments for the used bolts. These operations are intricate, and still produce poor results which might be duly expected from the intricate operations, and thus cause defects in the finish coating applied thereon. This problem remains objectionable from the point of view of ensuring the maintenance of sufficient corrosion resistance for a long length of time.

On the other hand, there is known a number of processes for the surface-treatment of bolts, nuts and screws by means of endurion, zinc-phosphating, electroplating, hot-dip coating, or simple painting, for example. In the case of screws, however, this surface treatment has been attempted to improve the surface appearance and corrosion resistance, while in the case of high tensile strength bolts, it has been attempted to prevent the retarded destruction. It follows that there are few commercially available processes for the surface treatment of bolts adapted for use with large scale steel construction.

Of these, a process is known for the application of a lubricant coating on nuts and washers which have previously been phosphated, the lubricant coating being comprised either of paraffin, or of molybdenum disulfide or polytetrafluoroethylene dispersed in a paint. This process is, however, particularly adapted for the improvement of the lubricating property as well as for uniformalization of the torque coefficient values. As far as are known, there is no presently commercially available bolts, nuts and washers which passees the following three important factors in combination: (1) good corrosion resistance; (2) a surface which provides a good base for later application of siccative organic coating compositions, such as, paint; and (3) good lubricity with uniformalized distribution of torque coefficients.

Accordingly, it is an object of this invention to provide novel bolts, nuts and washers embodying all of the above-mentioned three factors.

Another object is to provide a novel coating which imparts all of the above-mentioned three factors to a bolt, nut and washer coated therewith.

These and other objects of the invention are achieved by a two-step coating technique in which after having been cleaned by shot blast or acid-washing, a bolt, nut and washer is first treated with a phosphating solution containing phosphate of metals such as of iron, manganese, zinc and the like to form an adherent phosphate coating as a base coat, and is then coated thereon with a top coat comprising essentially a chromium compound contained in a vehicle solution and further containing one or more compounds selected from metal salts of higher fatty acid, polyolefin compounds and ethylene tetrafluoride polymers either dispersed, or dissolved, or swelled in the solvent of the vehicle solution.

The phosphate coating which is suitable for the purposes of this invention should have a thickness corresponding to a coating weight of 0.1 to 50 $g/m^2$, and is preferably of the so-called thick film type with a coating weight of 5 g to 30 $g/m^2$. The use of a phosphate coating having a weight of less than 0.1 $g/m^2$ will result in poor adhesion of the top coat to the metal base, and unsatisfactory lubricity of the top coat due to the localized deposition of the solid lubricant, i.e., the polyolefin compound and ethylene tetrafluoride polymer contained therein, when the bolt coated therewith is subjected to the fastening pressure. Further it tends to provide a coated metal surface inferior in the protection against scratching as well as in the corrosion resistance. Conversely when the coating weight exceeds 50 $g/m^2$, the coating becomes brittle due to its glass-like texture, thus it cannot assist in improving the above-identified three properties. Moreover, such coating weights are not beneficial because a considerably long length of time is required to produce the coating.

Examples of chromium compounds usuable in the invention include chromic acid, ammonium chromate, metal salts of chromic acid, t-butyl ester of chromic acid and chromium chelate compounds, such as, those resulting from a combination of chromium complex salts of phosphoric acid as contained in wash primers with polyvinyl butyral. These chromium compounds have a large effect on the improvement of the corrosion resistance as is known from a wide variety of accepted chromating treatment processes. As far as the improvement of the corrosion resistance is concerned, a larger chromium content in the top coating is the more preferable. However, as the chromium content increases, it tends to provide an unstable coating composition, for example, by causing the vehicle component to be deposited by gelation. In order to prevent the occurrence of such a phenomenon, the content of chromium compound in the top coating composition of the invention should be within the range of from 0.5 to 25% of chromium based on the dried top coating weight.

By the term "vehicle" herein used, it is intended to refer to a medium which provides a top coating effective to serve as an excellent base for the later application of siccative organic coating compositions such as paint, primers, synthetic resins and the like, and which is possesses sufficient adherence to the phosphate coating. There are many polymers which have heretofore been used as vehicles for the usual under-coating compositions. In view of the performance of bolts, nuts and washers, it is undesirable to use slow drying vehicles, such as, oil paint. Among the quick drying vehicles which are effective to serve the purposes of this invention are those of vinyl polymers, acrylic resin, epoxy resin and melamine-alkyd resin. These polymers and resins are used in the form of solutions or dispersions in water or organic solvents, for example, alcohol solutions of polyvinyl butyral which is conventionally used as an etching primer, aqueous acrylic resin emulsions, epoxy primers which are used to provide a base for enamel, and aqueous melamine-alkyd resin solutions.

As a lubricity-imparting ingredient, use may be made of a metal salt of a higher fatty acid, such as, sodium stearate, calcium stearate, zinc oelate and magnesium linolenate. In order to ensure the sufficient lubricating action of the composite coating of the invention, the higher fatty acid metal salt employed must be uniformly distributed in the vehicle of the resultant top coating. In other words, it must be either dissolved in, or swelled with the solvent of the vehicle solution, or otherwise no satisfactory lubricious properties cannot be imparted to the resultant composite coating. The content of higher fatty acid metal salt is preferably within the range of form 1 to 20% by weight based on the top coating weight. When the content exceeds the upper limit too much, the adhesion of the top coating to the phosphate coating is reduced.

Another example of the lubricity-imparting ingredient is polyolefin compounds, namely, polymers of ethylenic hydrocarbons, such as polyethylene, isotactic polypropylene and polybutene. The polyolefin compound usuable in the invention should have a molecular weight ranging from 1,000 to 10,000. Polyolefin compounds having molecular weights higher than the upper limit tend to provide coatings having poor lubricating properties. On the other hand, polyolefin compounds having molecular weights lower than 1,000 are soluble in the solvent of the vehicle solution to thereby change the character of the vehicle with the result of a decreased adhesion of the coating to the phosphate coating. It is to be understood that the polyolefin compound exists in the form of particles swelled or dispersed in the coating composition of the invention, the diameters of the particles being less than 50 microns and preferably less than several microns as a resulted of chemical pulverization. The content of the polyolefin compound should be within the range of from 1 to 50% by weight based on the top coating weight, and preferably from 5 to 20% by weight. When the content is less than 1%, an inferior lubricating property will result, while when it exceeds 50%, the adhesion of the coating becomes insufficient.

Ethylene tetrafluoride polymers as the lubricant may be added singly or in combination with the higher fatty acid metal salt and/or the polyolefin compound in the form of particles having diameters of less than 50 microns, and preferably less then several microns, to provide a good lubricate coating, provided that its content is limited to less than 50% by weight based on the top coating weight so as not to deteriorate the adhesion of the top coating to the base coating.

When two or three of these types of lubricant are used in combination, the total content of these lubricants must be adjusted to 1 – 50% by weight in a single top coating, or otherwise in the case of a lower content, sufficient lubricating property cannot be imparted thereto, and in the case of a higher content, it is impossible to improve the corrosion resistance with the sufficient adhesion of the coating to the phosphate coating.

The top coating weight suitable for the purpose of the invention is preferably within the range of from 0.1 to 50 g/m$^2$. In terms of thickness, the coating weight of 1 g/m$^2$ corresponds to a thickness of about 0.67 micron to about one micron, because the specific ratio of the top coating is found to be about 1.0 to about 1.5. With a coating weight of less than 0.1 g/m$^2$, it is impossible to improve the corrosion resistance, and further to provide for a lubricating effect with a higher torque coefficients due to the very small coverage of the lubricant coating on the phosphate coating. A top coating of a weight larger than 50 g/m$^2$ makes it difficult to initiate the engagement of a bolt with a nut, and then to rotate the bolt with reference to the nut, and the vice versa for a fastening operation with a lower torque coefficient therebetween than was in the conventional bolt and nut assembly. The improvement of the lubricating property of the bolt and nut coated in accordance with the invention is intended to reach a level of less than 0.150 and preferably less than 0.100 in terms of torque coefficient while still minimizing the range of distribution of the torque coefficients, thereby facilitating the fastening operation of each of the bolt and nut assemblies by application of an almost constant rating of torque force. The above-mentioned three types of lubricants have been found to achieve this improvement.

It will be appreciated from the foregoing description that the bolts, nuts and washers coated in accordance with the invention are usable with high performers attributable to the almost equalized and lowered torque coefficients, and their composite coatings have an ability to prevent formation of rust on the metal surfaces of these articles when they are exposed to outdoor humidities for a sufficiently long length of time until a paint of synthetic resin coating is applied thereon. This property also assists for the coating in serving as an excellent base for the application of the paint or a synthetic resin coating thereon. The utility of the bolts and nuts and washers of the invention is therefore, prominent when they are used to fasten the parts of steel constructions, such as, bridges and steel-skeleton buildings.

The invention is further illustrated in the following examples.

EXAMPLE 1

Specific samples of top-coating compositions of this invention are shown in Table 1 as being numbered from 5 to 12, in comparison with control samples as numbered from 1 to 4. Each of the compositions includes polyvinyl butyral as the vehicle, zinc chromate as the chromium compound, and alcohol as the solvent for the vehicle. This combination of ingredients is known as an etching primer. As is usual in the accepted practice of phosphating ferrous articles, ferrous bolts (nominal size W7/8; the length under head: 90 mm) and corresponding nuts and washers were cleaned by sand blast and chemical means to remove any grease, dirt, or oxides from their surfaces, and then subjected to the phosphating treatment to form a phosphate coating on the surface of each of these ferrous articles, while using different metallic ions in different samples as shown in Table 1. Next, the phosphated ferrous articles were top-coated with the compositions of samples 1 through 12. The properties of the top-coated phosphated ferrous articles are shown in Table 2. Sample 1 indicates that the exclusion of the phosphate coating cannot improve the corrosion resistance, and therefore it cannot serve as an excellent base for paints, and further that the torque coefficient value is relatively high. Sample 2 indicates that the exclusion of chromium compound from the top-coat results in a very poor corrosion resistance, and accordingly the composite coating serves as an inferior base for paints. Sample 3 which lacks the lubricant component, and sample 4 which contains polyethylene tetrafluoride but in an amount of less than 1% indicate that the torque coefficients are considerably high. Unlike these control samples 1 through 4, the samples 5 through 12 of the invention indicate that the torque coefficients are low, ranging from 0.086 to 0.137. Further, according to the outdoor weathering test, the corrosion resisting properties as shown to be excellent. Therefore, the samples of this invention provide excellent bases for the later application of paints.

coated with the following coating composition to form a top-coat of a weight of 20 g/m². The results of various tests identical to those made in Example 1 are shown in Table 3.

| Top-coating composition | Weight (g/m²) |
|---|---|
| Ammonium chromate | 1.00 (chromium) |
| Sodium stearate | 1.25 |
| Polyethylene tetrafluoride particles of diameters less than one micron | 1.00 |
| Polyethylene particles of diameters less than 0.5 micron | 1.25 |
| Acrylic resin aqueous emulsion vehicle | |

Table 3

| Corrosion resistance | Formation of no rust after exposure to the outdoor humidity for six months. |
|---|---|

Table 1

| | Phosphate under-coating | | Top coating composition and coating weight | | | | | |
|---|---|---|---|---|---|---|---|---|
| Sample No. | Metallic ions | Coating weight (g/m²) | Zinc chromate (g/m²) | Polyvinyl butyral (g/m²) | Calcium stearate (g/m²) | Polyethylene (g/m²) | Polyethylene tetrafluoride (g/m²) | Coating weight (g/m²) |
| 1 | None | 0 | 0.1 | 4.0 | 0.4 | 0.4 | 0 | 5.2 |
| 2 | Mn | 10 | 0 | 4.0 | 0.4 | 0.4 | 0 | 5.0 |
| 3 | Zn | 10 | 0.1 | 4.5 | 0 | 0 | 0 | 5.0 |
| 4 | " | 10 | 0.1 | 4.0 | 0 | 0 | 0.02 | 5.2 |
| 5 | Mn | 10 | 0.1 | 4.0 | 0.8 | 0 | 0 | 5.2 |
| 6 | | 10 | 0.1 | 4.0 | 0.4 | 0 | 0.4 | 5.2 |
| 7 | | 10 | 0.1 | 4.0 | 0 | 0.8 | 0 | 5.2 |
| 8 | | 10 | 0.1 | 4.0 | 0.4 | 0.4 | 0 | 5.2 |
| 9 | | 10 | 0.1 | 4.0 | 0.4 | 0.4 | 0.4 | 5.4 |
| 10 | Fe | 1.5 | 0.2 | 8.0 | 0.6 | 0.6 | 0 | 9.8 |
| 11 | Mn | 15 | 0.1 | 2.5 | 0.3 | 0.4 | 0 | 3.6 |
| 12 | Zn | 10 | 0.5 | 4.0 | 0.4 | 0.4 | 0 | 5.8 |

Table 2

| | | Properties of top coated phosphated ferrous bolts | | | Paintability*²⁾ Paint coating | | | |
|---|---|---|---|---|---|---|---|---|
| | Corro*¹⁾ | Lubricity | | | | | | |
| | sion | Torque coefficient | | | Epoxy type 30μ | Chrolinated rubber type 30μ | Phthalic acid type 50μ | Remark |
| Sample No. | resistance | Number of events | mean | Standard deviation | | | | |
| 1 | Many rust spots | 3 | 0.155 | 0.024 | ◎ | △ | △ | slightly poor |
| 2 | Red rust | 3 | 0.096 | 0.021 | x | x | x | poor |
| 3 | No rust | 3 | 0.236 | 0.037 | ◎ | ◎ | ◎ | " |
| 4 | " | 3 | 0.196 | 0.025 | ◎ | ◎ | ◎ | " |
| 5 | " | 10 | 0.137 | 0.012 | ◎ | ◎ | ◎ | good |
| 6 | " | 10 | 0.115 | 0.011 | ◎ | ◎ | ◎ | " |
| 7 | Few rust spots | 10 | 0.102 | 0.008 | ◎ | ◎ | ◎ | " |
| 8 | No rust | 20 | 0.090 | 0.009 | ◎ | ◎ | ◎ | excellent |
| 9 | " | 20 | 0.082 | 0.007 | ◎ | ◎ | ◎ | " |
| 10 | " | 10 | 0.092 | 0.009 | ◎ | ◎ | ◎ | " |
| 11 | " | 10 | 0.098 | 0.008 | ◎ | ◎ | ◎ | " |
| 12 | " | 10 | 0.097 | 0.009 | ◎ | ◎ | ◎ | " |

Note:
*¹⁾Results of the sea shore weathering test after exposure for six months.
*²⁾After the paint film is scratched, a pressure sensitive tape is applied on the scratched portion and then removed suddenly.
◎ No peeling off
○: Slightly peeling off
△: Considerably peeling off
x : Completely peeling off

EXAMPLE 2

After having been cleaned, a number of bolts made of high tensile strength steel (F11T) and having a size (Nominal size: M30; length under head: 15 mm) in combination with corresponding nuts and washers were treated with a phosphating solution containing phosphate and zinc phosphates to form an under-coating of a weight of 10 g/m². Next, the phosphated articles were

| Lubricity | Torque coefficient | 0.080 | (means of n = 100) |
|---|---|---|---|
| | Standard deviation | 0.008 | |
| Paintability | Epoxy type paint film | | 30 microns ◎ |
| | chlorinated rubber type | | 30 microns ◎ |
| | Phthalic acid type | | 50 microns ◎ |
| | Tar-epoxy type | | 70 microns ◎ |

What is claimed is:

1. A bolt, nut and washer having an adherent, corrosion resistant, lubricious and paintable coating applied on the surface thereof, said coating being composed of an under-coating layer of phosphate of metals having a weight of 0.1 to 50 g/m$^2$, and a top-coating layer of a weight of 0.1 to 50 g/m$^2$ and containing a paintable base-forming vehicle, a chromium compound present in an amount of 0.5 to 25% by weight of chromium based on the dried weight of the top coating, and a lubricity-imparting ingredient of one or more materials selected from the group consisting of metal salts of higher fatty acid in an amount from 1 to 20%, polyolefin compounds in an amount from 1 to 50%, and polyethylene tetrafluoride in an amount from 1 to 50%, these percents being % by weight based on the dried weight of the top coating.

* * * * *

UNITED STATES PATENT OFFICE
CERTIFICATE OF CORRECTION

Patent No. 4074011              Dated February 14, 1978

Inventor(s) Akira Teramae et al

It is certified that error appears in the above-identified patent and that said Letters Patent are hereby corrected as shown below:

In the heading of the patent [73] should read as follows:

-- [73] Assignee: Nippon Steel Corporation, Tokyo, Japan and Kobe Steel Ltd., Kobe-shi, Hyogo-ken, Japan --.

Signed and Sealed this

First Day of August 1978

[SEAL]

Attest:

RUTH C. MASON  
Attesting Officer

DONALD W. BANNER  
Commissioner of Patents and Trademarks